United States Patent Office 3,467,488
Patented Sept. 16, 1969

3,467,488
RADIATION GRAFTING OF MONO- AND DI-ACRYLATES OF LOWER POLYHYDRIC ALCOHOLS AND POLYHYDRIC ALCOHOL ETHERS TO COTTON AND WOOL
Robert Timmerman, North Massapequa, N.Y., assignor to Radiation Processing, Inc., a corporation of Delaware
No Drawing. Filed May 16, 1962, Ser. No. 195,338
Int. Cl. D06m 1/00
U.S. Cl. 8—116                3 Claims The present invention relates to a process for modifying natural fibers, and more particularly to the modification of naturally occurring fibrous materials such as cotton and wool by radiation induced graft polymerization of a suitable monomer thereon.

Specifically, the present invention relates to the production of water-repellant and shrink-resistant natural fibers and involves a graft polymerization reaction between a fibrous substrate and a water-insoluble acrylate monomer. The acrylates, all esters, correspond to the following formula:

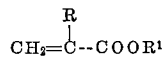

where R is hydrogen or methyl, and $R^1$ is lower alkyl or a 2–4 carbon glycol or a polyglycol ether as follows:

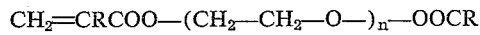

$n$ being 1–4 and R is, of course, H or $CH_3$.

As can be observed from the above formula, the monomeric acrylate esters employed for the practice of the present invention, can be classified as the lower alkyl and lower glycol esters of acrylic acid and methacrylic acid and also the esters of the di-, tri-, or tetra ethylene glycol ethers. Preferably, di-esters of these glycols and polyglycols are employed. For example, the lower alkyl esters contemplated for practice of the instant invention are methyl, ethyl, propyl, isopropyl, butyl, hexyl, 2-ethyl hexyl, and the like alkyl radicals having not more than eight carbon atoms.

The glycols which can be esterified with the acrylic or methacrylic acid include, for instance, ethylene glycol, propylene glycol and butylene glycol. Similarly, di-, tri-, and tetra ethylene glycol ether can form part of the monomeric acrylate ester. A preferred embodiment of the present invention utilizes the monomer of the di-methacrylate or di-acrylate ester of ethylene glycol. This material is a water insoluble di-functional monomer of high reactivity which results in a superior product.

In accordance with the practice of the present invention a monomer is first suspended in water as a stable emulsion by the utilization of conventional techniques and emulsifying agents. Employment of an aqueous emulsion serves to adjust the concentration of the monomer at the surface of the fiber, providing thereby control of the system based upon this factor. Further, the water serves as an accelerator for the grafting reaction through the formation of peroxides and hydroperoxides in the radiation field. Depending upon the characteristics of the final product and other factors of the system, the emulsion may contain from as low as 3% of monomer to as high as 50% monomer.

The emulsion contacted fibrous material is subjected to high energy ionizing radiation. This radiation provides emitted photons having an intrinsic energy which is greater than the planetary electron binding energies present in the monomeric acrylate ester and in the molecules of the fibrous substrates. Such high energy radiation is available from various radioactive substances which provide beta or gamma radiation, e.g. radioactive cobalt, nuclear reaction fission products, etc. Preferably, an electron beam generator, capable of delivering at least about 40,000 roentgens of beam energy per hour is employed. Since the modifying reaction of the acrylate monomer on the fiber substrate should be completed in as short a period of time as possible, so as to minimize degradation of the substrate or side polymerization reactions of the monomer, a relatively high dose of radiation, quickly applied, is preferred for practice of the invention. A period of from about 1 to 10 seconds of residence time in the radiation field is considered suitable with an accumulated dose of from about 0.25 mrad to 5 mrad of high energy ionizing radiation.

The exact irradiation treatment given a particular fibrous material is variable over a wide range because of the ability to select a particular acrylate monomer, the permissive variation in monomeric content of the emulsion, and the permissive variation in dosage rate and total dosage. The results of the irradiation induced graft polymerization therefore can be virtually tailored to the specific fibrous material, to its shaped form (as for example, knit, woven, skein, etc.) and also to the property most desired, e.g. water repellancy, shrink-resistance, etc.

Among the principal advantages of the present emulsion irradiation is the ability to employ monomers, e.g. the di-acrylates of lower polyglycols, whose physical properties, like high viscosity, water insolubility, extreme reactivity under irradiation, etc., do not permit their satisfactory use alone or in solution because of oxidation while in the radiation field and exposed to air.

For better understanding of the present invention, the following examples are presented in which, as a starting point for comparison, irradiation of aqueous solutions are discussed.

Six-inch by six-inch samples of cotton greige goods were immersed to saturation in aqueous solutions of water soluble monomers, then irradiated with high speed electrons, rinsed in water to remove unreacted monomer, and dried. The following tests were made to determine the basic property changes of the grafted fabric.

Weight percent graft.—A sample of grafted fabric was weighed and compared with a control sample of the same fabric untreated. Percent change in weight indicates the relative amount of monomer grafted.

Percent change in tensile strength.—A one-inch strip of the grafted material was subjected to its ultimate tensile strength and compared with a corresponding strip of non-grafted fabric.

Percent shrink.—Samples of grafted and non-grafted fabrics were soaked in water and squeeze-dried, placed in the oven at 100° C. until dry, and then respective surface areas compared.

Wrinkle test.—The samples from the shrink test were visually compared for amount of wrinkling and graded: 0=poor; +=fair; ++=good; and +++=excellent. All observations were made with respect to the control sample.

| Monomer in solution, percent | Radiation dose (mrads) | Percent change tensile Warp | Percent change tensile Fill | Percent shrink | Weight percent graft | Wrinkle test |
|---|---|---|---|---|---|---|
| None | 0 | 0 | 0 | 0 | 0 | 0 |
| 10% acrylamide | 1 | −10 | −20 | −4 | 2.2 | 0 |
| 30% acrylamide | 1 | 0 | −2 | +4 | 11.0 | + |
| 10% methacrylic acid | 1 | +1 | −2 | +5 | 16.0 | + |
| 30% methacrylic acid | 1 | +2 | −2 | +10 | 34.5 | + |

It can be seen from this data that although grafting proceeded to a relatively large degree, no positive tensile strength increases or wrinkle resistance was thereby imparted to the fabric. Shrinking properties, however, were favorably affected in all but one of these grafted fabrics.

Samples were next prepared using aqueous emulsions of water insoluble acrylate monomer. The emulsifying agents used to prepare the emulsions (not considered as reactive) in the system are: alkyl sulfonates, such as sodium lauryl sulfonate; and the saponified polyethylene glycols, such as polyethylene glycol mono-oleate.

| Monomer emulsion | Radiation dose (mrads) | Percent change tensile | | Percent shrink | Weight percent graft | Wrinkle test |
|---|---|---|---|---|---|---|
| | | Warp | Fill | | | |
| 25% methyl acrylate | 1 | +37 | 0 | 0 | +54 | ++ |
| 50% methyl acrylate | 1 | +43 | +3 | 0 | +98 | ++ |

The advantages of the methyl acrylate emulsion graft is apparent from the table. Though the tensile strength of the fill of the fiber was substantially unaffected, the tensile strength of the warp was substantially increased. Also, a greater percent graft had been obtained with this monomer at lower concentration than with the methacrylic acid monomer. Wrinkle resistance characteristics were also improved.

The monomer emulsions listed above were next grafted to a commercial woolen fabric containing 20% mohair, 20% reprocessed wool, 56% reused wool, and 4% mixed fibers. The results are tabulated below.

It is noteworthy that large gains in weight occurred through grafting of methyl acrylate to wool. With the wool grafts, it is apparent that some degree of wrinkle resistance was gained, and that a degree of shrink-resistance was obtained.

In still another and more extensive series of tests, the radiation procedure for all samples was generally as follows: Samples were cut to 17 x 14 inches, mounted on pin-frames 15 x 13 and immersed in the monomeric emulsion. While still wetted with the emulsion, they were passed through a scanned beam of high velocity electrons at a dose rate of 0.25 megarad per second per megarad of accumulated dose. A two megarad dose would then be accumulated at a rate of 0.5 megarad per second, and 0.5 megarad dose at a rate of 0.125 megarad per second. Samples were then immediately rinsed with running water until free of excess emulsion. They were fan dried, and then subjected to one or more wash-dry cycles using a conventional home washing machine and an electric dryer. The following tabulation shows the details of these tests:

| Fabric No.[1] | Monomer type | Percent | Radiation dose (mrads) | Percent change tensile | | Percent shrink | | Weight percent graft |
|---|---|---|---|---|---|---|---|---|
| | | | | Warp | Fill | Warp | Fill | |
| 1 | Control | 0 | 0 | 0.0 | 0.0 | −40.6 | +15.3 | −8.00 |
| 2 | Methyl acrylate | 33 | 2.0 | | | −18.6 | −15.3 | −7.15 |
| 3 | Ethyl acrylate | 33 | 2.0 | | | −8.5 | −5.1 | +67.00 |
| 4 | do | 5 | 1.0 | −4.0 | +5.25 | −27.0 | −5.0 | +13.4 |
| 5 | do | 15 | 1.0 | +29.3 | −12.8 | −20.0 | +10.0 | +14.9 |
| 6 | do | 25 | 1.0 | +33.0 | −15.0 | −30.0 | +15.0 | +19.2 |
| 7 | do | 27.2 | 2.0 | | | −30.0 | +9.0 | +24.2 |
| 8 | 2-ethylhexyl acrylate | 27.2 | 2.0 | | | −25.0 | +7.5 | +67.4 |
| 9 | Control | 0 | 0 | 0.0 | 0.0 | −12.9 | −2.3 | 0.0 |
| 10 | Ethyl acrylate | 20.0 | 2.0 | −36.5 | −18.2 | −12.9 | 0.0 | +6.62 |
| 11 | 2-ethylhexyl acrylate | 20.0 | 2.0 | −54.2 | −57.0 | −9.84 | 0.0 | +11.75 |
| 12 | Butyl acrylate | 20.0 | 2.0 | −43.7 | −43.8 | −12.7 | 0.0 | +5.9 |
| 13 | (Ethyl acrylate) (ethylene glycol dimethacrylate) | 10.0 | 2.0 | −24.2 | −8.75 | −11.3 | 0.0 | +11.0 |
| 14 | Ethyl acrylate | 20 | 1.0 | −32.5 | −18.0 | −9.5 | 0.0 | +5.0 |
| 15 | 2-ethylhexyl acrylate | 20 | 1.0 | −33.5 | −24.0 | −11.0 | 0.0 | +7.2 |
| 16 | Butyl acrylate | 20 | 1.0 | −29.5 | −19.5 | −9.5 | 0.0 | +3.5 |
| 17 | (Ethyl acrylate) (ethylene glycol dimethacrylate) | 10 | 1.0 | −19.5 | −10.5 | −11.5 | 0.0 | +5.8 |
| 18 | SR-205 (dimethacrylate) | 33 | 0.5 | +31.7 | −34.2 | −13.0 | −7.0 | +42.8 |
| 19 | do | 33 | 1.0 | +2.2 | −34.8 | −16.6 | −7.0 | +42.8 |
| 20 | do | 33 | 2.0 | −6.0 | −53.2 | −11.0 | −9.4 | +43.8 |
| 21 | SR-209 (dimethacrylate) | 33 | 0.5 | +23.6 | −18.3 | −9.8 | 0.0 | +105.0 |
| 22 | do | 33 | 1.0 | −5.5 | −33.4 | −3.0 | −9.5 | +110.0 |
| 23 | do | 33 | 2.0 | −7.0 | −44.7 | −10.8 | −7.0 | +97.7 |
| 24 | SR-210 (dimethacrylate) | 33 | 0.5 | +32.5 | −25.5 | −13.0 | −2.5 | +77.0 |
| 25 | do | 33 | 1.0 | −4.0 | −30.5 | −7.7 | −4.5 | +119.0 |
| 26 | do | 33 | 2.0 | +4.0 | −46.9 | −6.5 | −3.4 | +149.0 |
| 27 | SR-205 (dimethacrylate) | 33 | 0.5 | +51.2 | −20.8 | −13.0 | −4.7 | +55.2 |
| 28 | do | 33 | 1.0 | +35.8 | −33.5 | −16.5 | −7.2 | +38.2 |
| 29 | do | 33 | 2.0 | +7.5 | −47.2 | −16.2 | −12.0 | +40.3 |
| 30 | SR-209 (dimethacrylate) | 33 | 0.5 | +23.9 | −29.0 | −11.2 | 0.0 | +100.0 |
| 31 | do | 33 | 1.0 | +22.8 | −39.5 | −6.4 | −9.5 | +107.8 |
| 32 | do | 33 | 2.0 | +4.9 | −50.2 | −15.2 | −4.7 | +90.0 |
| 33 | SR-210 (dimethacrylate) | 33 | 0.5 | +57.3 | −24.5 | −13.0 | −3.5 | +74.0 |
| 34 | do | 33 | 1.0 | +18.2 | −39.5 | −11.2 | −4.7 | +116.0 |
| 35 | do | 33 | 2.0 | +22.8 | −39.5 | −8.0 | −1.3 | +141.0 |
| 36 | SR-205 (dimethacrylate) | 25 | 0.5 | +19.2 | −35.7 | −14.5 | −2.3 | +32.1 |
| 37 | do | 25 | 1.0 | +20.8 | −32.0 | −13.6 | −9.5 | +65.5 |
| 38 | do | 25 | 2.0 | +2.7 | −41.2 | −10.2 | −7.1 | +73.5 |
| 39 | do | 20 | 0.5 | +47.2 | −27.0 | −12.9 | −9.5 | +60.0 |

[1] In Example Numbers 1 through 8, cotton knit, sweater grade was used. In the remainder, cotton knit, underwear grade was used.

Samples 8, 11, 12, 15 and 16 showed a marked tendency to repel water from their surfaces, even after wash-

| Monomer emulsion | Radiation dose (mrads) | Percent change tensile | | Percent shrink | Weight percent graft | Wrinkle test |
|---|---|---|---|---|---|---|
| | | Warp | Fill | | | |
| 25% methyl acrylate | 1 | +32 | +36 | +11 | +52 | ++ |
| 50% methyl acrylate | 1 | +52 | +50 | +14 | +101 | ++ | ing. They also showed appreciable gain over the control and other monomer-modified fabrics in their ability to return to their original shape and size after deformation, a measure of wrinkle-resistance.

General discussion of results (1) Fabric numbers 2–8 show the results of grafting the sweater grade fabric with monofunctional monomers. The tests demonstrate that ethyl acrylate grafted heavily as compared with methyl acrylate; appreciable weight percent grafts were obtained with this monomer with as low as 5% concentration of ethyl acrylate. Tensile in the warp increased appreciably at high weight percent graft, but slight decreases in the fill tensile were noticed. Shrink properties were somewhat benefited, but only at the highest weight percent graft.

(2) Fabrics number 10–18 show the effect of grafting various monomers on the underwear grade cotton knit. At all radiation doses, the monofunctional monomers demonstrated decreases in tensile in the warp and in the fill even though some appreciable percent grafts were obtained. Shrinkage in the warp was always similar to the control sample, no advantage being obtained through grafting. A positive improvement obtained was the definite tendency for the butyl acrylate and 2-ethyl hexyl acrylate monomer, even at low weight percent grafts, to shed water.

(3) The most dramatic advantage of radiation grafting was shown by using di-functional monomers of the ethylene dimethacrylate type. At similar radiation doses and on similar fabric these monomers reacted to a much greater extent that the monofunctionals. The monomer SR–209 reacted to the extent of greater than 100% graft at as low as 0.5 megarad of radiation. A dramatic change in warp tensile can be seen as a function of radiation dose. Fabric numbers 18, 21 and 24 show the largest increases in warp tensile with the smallest decreases in fill tensile. Only the "hand" of these three samples could be considered wearable. All other samples in this series were too stiff to be used in wearing apparel.

In order to determine the stability of these physical properties to conventional washing, the fabrics were run again through a wash-dry cycle, and the property values recorded as fabric numbers 27–35. As can be seen, the tensile, shrinkage, and weight percent graft were relatively constant after the second washing showing durability of properties.

(4) Samples 36–39 show the effect of decreasing the di-functional monomer concentration. By comparison with samples 27–29, it can be seen that weight percent graft has actually been increased slightly by reducing the monomer concentration, and greater tensile strength increases in the warp are noticeable at both lower monomer concentrations and lower radiation doses. It would appear that, in these examples, the radiation beam acts as a trigger for a self-propagating reaction, and that reaction with the cellulose molecules occurs during the propagation of this reaction.

General conclusions (1) High weight percent grafts to cotton and woolens can be obtained by irradiation of cottons with aqueous emulsions of a water insoluble acrylate ester monomer.

(2) Radiation doses in excess of one megarad tend to destroy structural properties of fabrics even though appreciable grafts are obtained. Irradiation induced grafts as much as 100% by weight of the fabric may be obtained by irradiation at 0.5 megarad.

(3) The most hydrophobic monomers such as butyl acrylate and 2-ethyl hexyl acrylate showed strong water-repellent and memory characteristics when compared with the other samples used.

(4) Grafting the polyfunctional monomers ethylene glycol dimethacrylate, tri-ethylene glycol dimethacrylate, and tetraethylene glycol dimethacrylate produced increases in tensile strength as large as 50% with as low as a 0.5 megarad radiation dose.

(5) High weight percent grafts of any monomer on knitted cotton goods (sweater grade) resulted in marked form stability and appreciable shrink resistance. On the underwear grade material, no such improvement in shrink resistance or form stability was obtained, demonstrating that the character of the substrate affects the results.

(6) The physical property changes that occur as a result of grafting are permanent to washing.

What I claim is:

1. Process for rendering fibers selected from the group consisting of cotton and wool water-repellent and shrink-resistant, which comprises immersing said fibers in an aqueous emulsion of a water insoluble acrylic ester monomer selected from the group consisting of the mono- and di-acrylates and methacrylates of lower polyhydric alcohols and polyhydric alcohol ethers containing from 1 to 8 carbon atoms, and then subjecting said fibers and said monomer to high energy ionizing radiation having an intensity between about 0.25 and about 5.0 megarads, for a period of from about 1 to about 10 seconds, to effect graft polymerization of said monomer on said fibers.

2. The process of claim 1 in which the aqueous emulsion contains from 3% to about 50% by weight of the monomer.

3. The process of claim 1 in which the monomer is ethyleneglycol dimethacrylate.

References Cited

UNITED STATES PATENTS

| | | |
|---|---|---|
| 2,959,565 | 11/1960 | Stanton et al. |
| 2,994,681 | 8/1961 | Hammon et al. |
| 2,994,682 | 8/1961 | Hammon et al. |
| 3,008,920 | 11/1961 | Urchick. |
| 3,029,218 | 4/1962 | Murdock et al. |
| 2,958,673 | 11/1960 | Jen. |
| 2,999,056 | 9/1961 | Tanner. |
| 3,101,276 | 8/1963 | Hendricks _____ 8—116 X |
| 3,236,584 | 2/1966 | Degering _____ 8—116 |

NORMAN G. TORCHIN, Primary Examiner

J. CANNON, Assistant Examiner

U.S. Cl. X.R.

8—128